H. F. SEEBERGER.
BIRD AND FOWL PERCH.
APPLICATION FILED DEC. 14, 1910.

992,071.

Patented May 9, 1911.

WITNESSES
Edward Thorpe
W. S. Orton.

INVENTOR
Henry F. Seeberger

BY
ATTORNEYS

UNITED STATES PATENT OFFICE.

HENRY F. SEEBERGER, OF JERSEY CITY, NEW JERSEY.

BIRD AND FOWL PERCH.

992,071.   Specification of Letters Patent.   Patented May 9, 1911.

Application filed December 14, 1910. Serial No. 597,337.

*To all whom it may concern:*

Be it known that I, HENRY F. SEEBERGER, a citizen of the United States, and a resident of Jersey City, in the county of Hudson and State of New Jersey, have invented a new and Improved Bird and Fowl Perch, of which the following is a full, clear, and exact description.

This invention relates to a new and improved form of perch and roost for birds and fowl, and one object of the invention is to provide a form of perch adapted to collect the vermin which infests the fowl, and affords means whereby said perch may readily be cleaned. I attain this object by constructing a perch having recesses inserted from the under side and inclined at an angle to the axis of the perch.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in both the figures, and in which—

Figure 1:
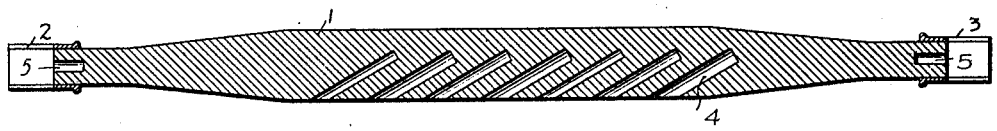
Figure 2:
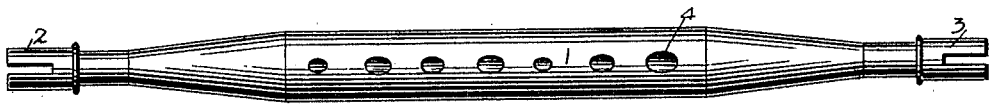

Figure 1 is a longitudinal sectional view taken through the axis of my improved perch, and Fig. 2 is an elevation looking up from the bottom of the perch.

In the preferred embodiment of my invention here disclosed, I have shown a perch 1 of wood, metal or any suitable material, and of any preferred construction or configuration, preferably having an enlarged central portion, having the customary slotted ends 2 and 3 of brass or other suitable metal, whereby the perch is positioned on its supports, and having centrally-disposed recesses or pockets 4, angularly disposed in the perch and arranged parallel to one another, in this instance, disposed at an angle of about 45 degrees to the axis of the perch. The angular disposition of these recesses has an advantage over a pocket inserted at right angles to the axis of the perch, in that there is less likelihood of the claws of the birds catching in these open-end recesses. Further, to afford more pockets, each end of the perch is recessed axially as shown at 5.

It has been found that vermin and insects will come from all parts of the cage or coop and will attack the bird or fowl during the night, and in the morning will leave the bird and enter the small caverns or pockets 4 underneath the perch and the recesses 5 at the ends of the perch, and, if promptly attended to, will not spread through the cage or coop. This perch may be taken out in the morning and by standing it on the end 2, may be quickly cleaned by scalding the same with hot water, or the perch may be effectively cleaned by vigorously stamping it on end, thereby dislodging the vermin by the dry process.

As many changes could be made in the above construction and many apparently widely different embodiments of this invention could be made without departing from the scope thereof, it is intended that all matters contained herein in the above description or shown in the accompanying drawings shall be interpreted as illustrative and not in a limiting sense. It is also to be understood that the language used in the following claims is merely intended to cover all the generic and specific features of the invention herein described and all statements of the scope of the invention, which, as a matter of language, might be said to fall therebetween, and that materials, sizes and relativities of parts are non-essential, except as called for in the claims.

Having thus described my invention, I claim as new and desire to secure by Letters Patent:

1. A fowl perch having longitudinally and angularly-disposed pockets in the sides thereof, all of said pockets inclined in the same direction toward one end of the perch, and axially-disposed pockets in the ends of the perch adapted to collect vermin from the fowl, and supporting means at the ends of said perch.

2. In a fowl perch having an enlarged central portion, a series of separated pockets extending into said enlarged portion at an acute angle to the axis of the perch, thereby preventing the catching of the claws of the fowl in said pockets.

In testimony whereof I have signed my name to this specification in the presence of two subscribing witnesses.

HENRY F. SEEBERGER.

Witnesses:
W. S. ORTON,
PHILIP D. ROLLHAUS.

Copies of this patent may be obtained for five cents each, by addressing the "Commissioner of Patents, Washington, D. C."